UNITED STATES PATENT OFFICE.

ALEXANDER D. ELBERS, OF HOBOKEN, NEW JERSEY.

PROCESS OF TREATING CLAY AND PRODUCTS THEREOF.

SPECIFICATION forming part of Letters Patent No. 485,917, dated November 8, 1892.

Application filed October 20, 1891. Serial No. 409,316. (No specimens.)

*To all whom it may concern:*

Be it known that I, ALEXANDER D. ELBERS, a citizen of the United States, residing at Hoboken, in the county of Hudson and State of New Jersey, have invented a new and Improved Process for Treating Clay for the Lining of Metallurgical Furnaces and Melting-Vessels, of which the following is a full, clear, and exact description.

This invention relates to a process for treating comparatively-pure clay, such as kaolinite or kaolin, for lining the hearths of metallurgical furnaces and the inside of melting-vessels, and for similar uses.

The prime object of this invention is to provide a refractory material which is comparatively proof against corrosion by liquid-melted monosilicate slag that consists, as does the slag of many iron-ores-melting or so-called "blast" furnaces, essentially of silicates of the earthy and earth-metal bases. As such blast-furnace slag carries only small quantities of alkalies, it cannot dissolve the essential constituent of a clay (considered as dehydrated aluminum silicate of the composition ($Si_2 Al_2 O_7$) to any appreciable extent; but it attacks eagerly the free silica, free basic oxides, and other fluxible accidental constituents of which the purest washed clay usually still contains in the aggregate several per cent., and it also dissolves in its molten condition those fritted compounds to which several of these constituents unite with portions of the aluminum silicate of the clay when the latter is subjected to intense heat. Thus, for instance, when a clay is being calcined or a clay brick fired very hard one part, by weight, of the contained free silica can render soluble over three, one part of calcium oxide nearly four, and one part of magnesium oxide over five parts of the aluminum silicate of the clay. Hence it seems evident that even the purest commercial clay would when used for a hearth-lining be cut away rapidly by molten slag of the kind referred to and of monosilicate or of approximate basic constitution. That the lining of the blast-furnaces in which such slag is made holds out against corrosion as long as it usually does is partly due to the more or less frequent formation of a sticky coating of agglomerated slag, metal, and coke or coal-dust, which on account of its contents of infusible carbon redissolves but slowly, and thus prevents the liquid melted slag from coming in direct contact with the lining; but its duration is chiefly owing to the circumstance that the saturating energy of the liquid basic blast-furnace slag is considerably blunted by the sulphides which it always carries. These sulphides, which are in intermolecular combination with the slag, vitiate it also for the many profitable uses to which it might otherwise be put, whereas those kinds of blast-furnace slag that are too acid to absorb sulphur have, on the other hand, neither a measurable value for direct utilization nor for manufacture. The problem how to desulphurize blast-furnace slag in an economical manner is, therefore, an important one. Its solution lies apparently in the direction of desulphurizing the slag in its molten state in a reverberatory furnace; but the hearth which is to be used for such a purpose will require a much more refractory lining than the blast-furnaces have, because the desulphurizing process does not involve the formation of carbonaceous deposits that could protect it against corrosion and because the corroding propensity or saturating energy of the slag intensifies considerably in the measure in which the sulphur is expelled from it. This requirement will, I believe, be fully met by my invention.

The invention consists in treating suitable clay with a flux that will combine wholly or in part with the fluxible accidental constituents of the clay when the mix of clay and flux is intensely heated and in heating and working such a mix until its fusible portions become separated wholly or in part from the infusible ones.

The process can be carried out as follows: For a flux I use, by preference, desulphurized and otherwise purified blast-furnace slag of monosilicate or approximate constitution—a material that is best made from "slag-wool" or so-called "mineral wool"—by the aid of a process for which United States Letters Patent No. 278,002, dated May 22, 1883, have been issued to me. This flux is an impalpable powder with which the clay that is to be treated must be thoroughly intermixed. Its manufacture has been described at length in the *Engineering and Mining Journal* of May 21, 1887. It reacts at a less elevated temperature on those accidental constituents that can combine chemically with the essential constituent of the clay than they require to unite with it. The critical temperature at which the fluxible accidental constituents of the clay frit together with the admixed flux in preference to uniting with the aluminum silicate sets in at about red heat. The fritted compounds that are then formed melt at about white heat, and they can become sufficiently-thin fluid to percolate the mass and to exude from it, provided that the flux has been admixed in such proportions that its constitution will only be raised from a monosilicate to a sesquisilicate ratio or thereabouts in the event it absorb all of the clay's fluxible matter. Thus one per cent. of free silica contained in the clay will require of the flux about five and a half parts, by weight, in order to form sesquisilicate, and one per cent. of orthoclase feld-spar will require about one and three-quarter parts of it; but as the clay usually contains, also, some remnants of basic impurities the latter offset to some extent the quantity of flux that is required for the acid ones. The most suitable proportions of admixture are, however, most easily determined experimentally by melting-tests.

The clays that are best adapted for the treatment herein described contain from two to five per cent. of fluxible accidental constituents, (mostly acid ones,) and the proportion of flux that is required for their treatment is apt to vary between ten and fifteen per cent. of the weight of the dry clay.

I now proceed to describe the different operations. The clay is mixed with water until it assumes the consistency of a thick slip, and the flux is gradually stirred into the slip. The latter is then dried until it becomes a stiff paste, and the paste is best formed by hand into perforated balls of from two to four inches in diameter. These balls are thoroughly dried in any convenient manner and then are piled in heaps on the sole or hearth of a heating-furnace. The heating-furnace should be capable of enduring about as high a heat as that at which wrought-iron melts. The hearth should be lined at first with calcined and ground kaolinite that has been mixed with tar. Later on this lining can be repaired or replaced with the new material herein described. The heat is conducted as follows: The charge, consisting of the aforementioned perforated balls, is kept at the critical "fritting" temperature as long as may be found necessary—probably for about an hour. Then the furnace is fired harder until the balls melt down and spread out to a pasty mass. When this melting-heat grows still more intense, then the fluxed impurities exude gradually from the mass, gather in pools on top, or flow off. That which flows out is hereinafter referred to as the "slag." This slag percolates and collects rather slowly, because its specific gravity does not differ much from that of the fining mass. Hence it may be advantageous to rake or work the charge somewhat, which is best done with a hard-burned scraping-tool made of fire-clay and having a hollow stem into which an iron bar can be inserted. The charge can also be banked in such manner that the slag must gather on top of the spreading charge until it overflows the bank, from whence it may then be discharged through the work-hole or through an extra tap-hole provided for that purpose. The slag is apt to be quite vitreous and sufficiently transparent when suddenly cooled to render clay particles visible that may have remained suspended in it. It can be used to advantage for making colored glass, and possibly, also, for making up a sulphur-free slag for various metallurgical purposes.

The progress of the heat can be easily ascertained by examining small test-pieces that have been drawn out of the fining-charge and chilled in water.

The heat is finished when the fractured surfaces of the test-pieces are comparatively free from vitrified particles and of a rather homogeneous stony appearance.

The finished charge should also be chilled. It must either be broken out of the hearth, in which case it can be chilled by injecting water into the furnace, or it can be raked out while still very hot.

The chilled pieces should be assorted after having been crushed to about egg-size. The unsound pieces can be reburned with the next charge. The sound ones are to be ground coarse or fine, according to requirement, and the ground stuff is ready for use.

The material thus prepared I call "pyroconcentrates of fluxed clay." Its distinguishing characteristics, as compared with merely-calcined-clay substance, are as follows: The pyroconcentrates of fluxed clay consist, practically, of aggregates of aluminum silicate molecules that are bound together by vitrified remnants, mostly in the form of very thin films of the liquefied slag. When a comminuted mass of such concentrates is intensely heated, these vitrified particles resoften to some extent and then act as a mechanical bond without reacting, chemically, on the aluminum silicate. Granting that a lining which contains such remnants of the liquated slag may be attacked by a bath of liquid-melted monosilicate slag, it stands to reason that the ensuing corrosion cannot be very energetic, considering that the silicate constitution of the slag bath does not differ much from that of the slag remnants of the lining. Pure clay substance, on the other hand, contains nothing that could bind it under heat, and if a clay does frit together in calcining this chemical action is evidence that the calcined mass contains sufficient soluble matter to become readily decomposed by a corrosive-slag bath. The pyroconcentrates can be applied in the usual manner after mixing with tar, &c., for lining the inside of melting vessels and furnaces, as a top dressing for linings made of other material, and for the manufacture of tuyeres, crucibles, and other refractory products. Its proper application as a hearth-lining allows, as already explained, of holding and manipulating a thin-fluid slag, which is so corrosive that it readily destroys the acid, as well as the basic and so-called "neutral" linings that have been thus far devised. This feature may also give rise to an important improvement in the manufacture of steel, inasmuch as a decarbonized steel bath can be purified from remnants of sulphur and phosphorus by bringing it into intimate contact with thin-fluid desulphurized blast-furnace slag. That such slag readily absorbs ferrous sulphide bodily—i. e., holding it in intermolecular combination—and that it readily combines, chemically, with phosphoric oxide and phosphates is well known; but in order to desulphurize the slag and in order to utilize the desulphurized slag for the indicated purpose the suitable hearth-lining material had first to be devised.

The mechanical portion of the herein-described method of treating clay allows obviously of many modifications that are determined in actual practice—as, for instance, the most suitable shape and sizes of the pieces that are to constitute the charges and the manner of forming them, the most suitable devices for furthering the overflow of the slag from the fining charge and the arrangement of the earth, which will be most advantageous for facilitating the separation of the slag from the fining charge—such modifications depending additionally upon the capacity and construction of the furnace plant that is to be used and on the volume of the charges that are to be treated.

Having thus described my invention, I claim as new and desire to secure by Letters Patent—

1. The herein-described process of treating clay for the lining of metallurgical furnaces, &c., which consists in intermixing suitable clay with a flux which, if admixed in suitable proportions, combines with the fluxible accidental constituents of the clay to a thin fluid percolating slag when the mix is heated to about white heat; in preparing the mixes of clay and flux by forming and drying for the heating operation; in subjecting the prepared charges on the hearth of a suitable heating-furnace first to a fritting heat and then to a melting-heat; in furthering the outflow and removal of the slag from the melting and molten charges by suitable manipulation; in drawing and chilling the finished charges, and in preparing them for use by crushing, assorting, and grinding.

2. As a new article of manufacture, pyro-concentrates of fluxed clay, consisting of particles of dehydrated aluminum silicate holding remnants of a liquated flux in mechanical combination, substantially as described.

ALEXANDER D. ELBERS.

Witnesses:
J. F. ACKER,
C. SEDGWICK.